United States Patent [19]

Durham

[11] E Patent Number: Re. 33,112

[45] Reissued Date of Patent: Nov. 14, 1989

[54] APPARATUS FOR HOUSING AND DEPLOYING A RADAR DETECTOR IN AN AUTOMOTIVE VEHICLE

[76] Inventor: Timothy N. Durham, Rte. 8, Box 153, Conway, S.C. 29526

[21] Appl. No.: 216,778

[22] Filed: Jul. 8, 1988

Related U.S. Patent Documents

Reissue of:

[64] Patent No.: 4,684,164
Issued: Aug. 4, 1987
Appl. No.: 923,415
Filed: Oct. 27, 1986

[51] Int. Cl.[4] ..... B60R 7/04

[52] U.S. Cl. ..... 296/37.7; 296/37.8; 296/37.12; 180/167

[58] Field of Search ..... 296/37.7, 37.8, 37.12; 180/167; 224/42.42 R

[56] References Cited

U.S. PATENT DOCUMENTS

| | | | |
|---|---|---|---|
| 1,819,516 | 8/1931 | Kelly | 296/37.7 |
| 1,964,339 | 6/1934 | Brassell | 296/37.7 |
| 4,346,774 | 8/1982 | Hirota et al. | 180/167 |
| 4,640,542 | 2/1987 | Watjer et al. | 296/37.8 |

*Primary Examiner*—Robert R. Song
*Attorney, Agent, or Firm*—James R. Haller; Gregory P. Kaihoi

[57] ABSTRACT

The drawings illustrate an apparatus for housing a radar detector between the roof and an exposed inner surface of automotive vehicle and for deploying the radar detector in operable position during movement of the vehicle, utilizing a switch means for actuating suitable electrically operated means for raising and lowering the radar detector.

10 Claims, 3 Drawing Sheets

APPARATUS FOR HOUSING AND DEPLOYING A RADAR DETECTOR IN AN AUTOMOTIVE VEHICLE

Matter enclosed in heavy brackets [ ] appears in the original patent but forms no part of this reissue specification; matter printed in italics indicates the additions made by reissue.

BACKGROUND OF THE INVENTION

Radar detectors have a ready market and are therefore especially vulnerable to theft, as they are visible from the outside of a vehicle. Even though a vehicle is locked thieves are often inclined to risk breaking the window of the vehicle in order to gain access for stealing radar detectors. In the case of vans, motor homes and recreational vehicles, an apparatus which is automatically operable for concealing the radar detector, automatic upon and responsive to cessation of the operation of any system of the vehicle, would be of special interest particularly from a novelty standpoint. Such apparatus would also be specifically directed to trucks, although such may also be utilized in automotive vehicles as in an alternate form of the invention illustrated herein or in some other external inner surface of the vehicle. Such may even be a part of and concealed within a sun visor.

Radar detectors have been deployed beneath a vehicle as illustrated in U.S. Pat. No. 4,346,774. Other structures which depend from and are concealed adjacent the roof of a vehicle are illustrated as in U.S. Pat. No. 1,964,339.

Accordingly, it is an important object of the invention to provide an apparatus which is automatically operable to conceal a radar detector as between the roof and exposed inner surface of the vehicle to avoid exposure to view from outside the vehicle.

Another important object of the invention is to provide a novel device which may be deployed automatically upon starting of an automotive vehicle and retracted upon cessation of operation.

SUMMARY OF THE INVENTION

It has been found that apparatus may be provided for housing and deploying a radar detector within an exposed inner surface of an automotive vehicle by providing a retractable support with electrically operated means for automatically moving the support between a retraced and a deployed position which may be automatically responsive to a signal resulting from cessation of operating any of the systems of a vehicle. It is desirable that a support be provided carrying a Velcro strip for engagement with a Velcro strip carried by the radar detector. Preferably a switch means is actuated responsive to the ignition switch for automatically retracting and deploying the radar detector. A remote switch provides actuation of the switch means responsive to the operation of the ignition switch and acts as an overriding means should the operator not desire to use the radar detector and its deploying and concealing features hereof. The apparatus preferably is located in the ceiling of the automotive vehicle as in the recess between the ceiling and the roof and depends therefrom when deployed from normal operation of the radar detector opposite the windshield.

BRIEF DESCRIPTION OF THE DRAWINGS

The construction designed to carry out the invention will be hereinafter described together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate apparatus for housing a radar detector between the roof and an exposed inner surface of an automotive vehicle such as a van and for deploying the radar detector in operable position opposite the windshield during movement of the vehicle. The apparatus includes a support A for the radar detector. Means B carry the support for movement from an operable position to a retracted position between the roof and said exposed surface. Electrically operated means C move the means carrying the support from the operable position to the retracted position. Switch means D automatically actuate the electrically operated means responsive to cessation of operation of the vehicle. A cover panel E has an exposed surface compatible with the exposed inner surface and in substantial alignment or flush therewith when the support is in retracted position.

Figure 1:
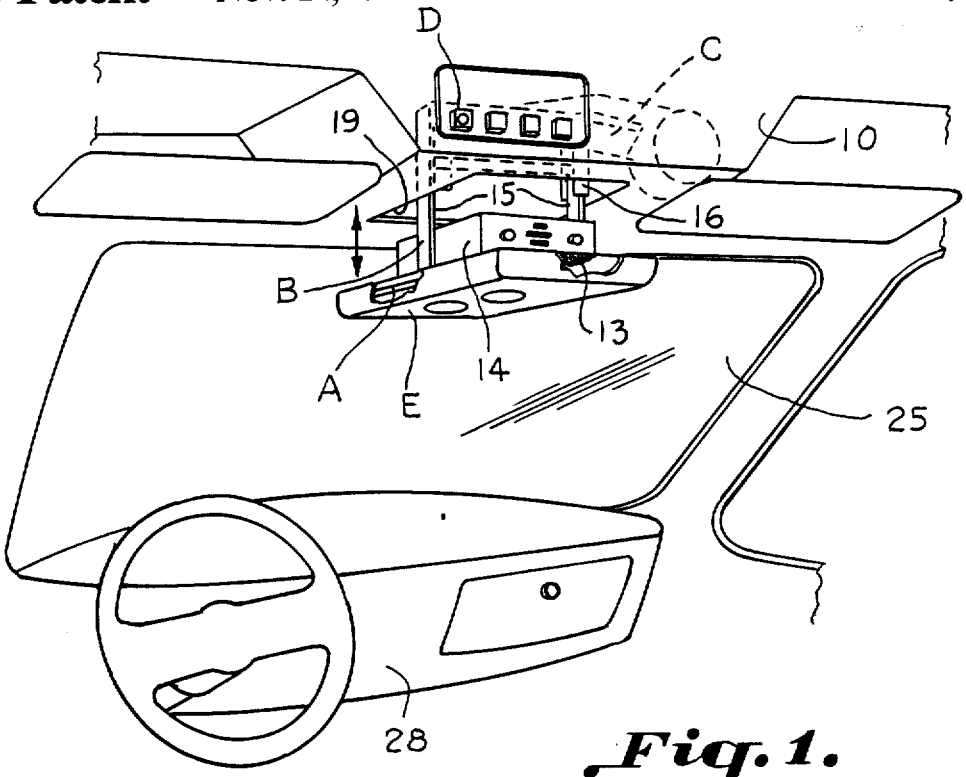
FIG. 1 is a perspective view illustrating apparatus constructed in accordance with the present invention carrying the radar detector in normal operable position opposite the windshield.

FIG. 1 illustrates a console 10 of the often found adjacent the front ceiling portion of a van. The console 10 is carried beneath the roof of the automobile and serves as a ceiling as further illustrated at 11 in FIG. 2. The support A is provided in the form of a panel or substantially rectangular block A for carrying a Velcro pad 12 receiving a Velcro pad or strip 13 carried by an opposite portion of the radar detector illustrated at 14.

Figure 2:
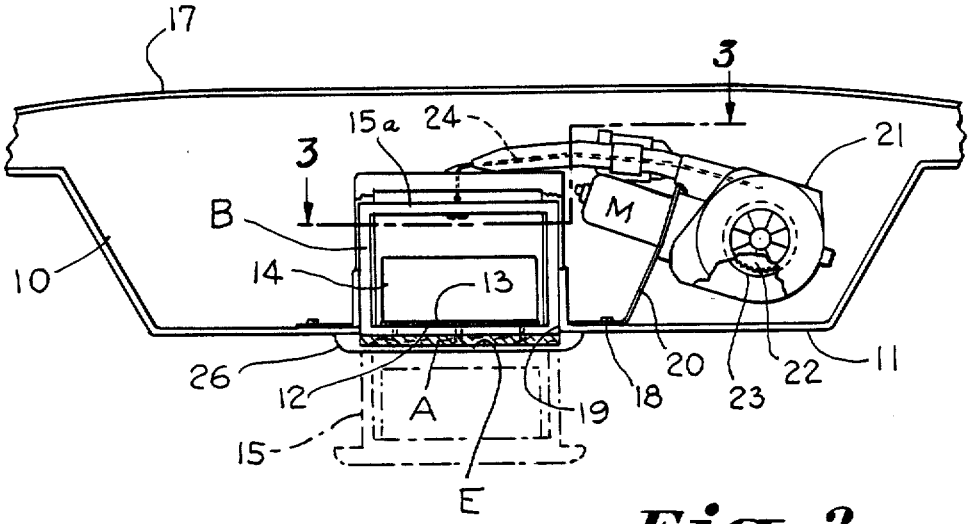
FIG. 2 is a longitudinal sectional elevation further illustrating the apparatus of FIG. 1.

The support A is carried by means B in the form of vertical linkage 15 connected on one end to the support A and on the other end slidably carried within a frame 16 which has suitably fixed mounting within the recess provided between the ceiling portion 11 and the roof 17 (FIG. 2). The frame 16 is attached as by screws 18 within an opening 19 within the ceiling. A bracket portion 20 of the frame carries a motor M as well as a housing 21. The housing 21 contains a toothed drum 22 operated by the electric motor M for engaging toothed cable 23 for carrying the cable schematically illustrated at 24 and having connection with a bar 15a connected between the vertical linkage members 15.

The motor M forms a part of the electrically operated means C for carrying the support A from a retracted position as illustrated in solid lines in FIG. 2 to an operable position opposite the windshield 25 of the automotive vehicle as illustrated in FIG. 1. A cover member is illustrated at E which has an exposed finish or surface which is compatible with the ceiling surface of the automobile and which is preferably calculated to conceal the radar detector when the apparatus is in retracted position. The cover is preferable substantially flush with the ceiling and has upturned or beveled edges 26 and is suitable secured to the base of the support A If desirable, the support A may serve as a cover for the opening 19.

Figure 4:
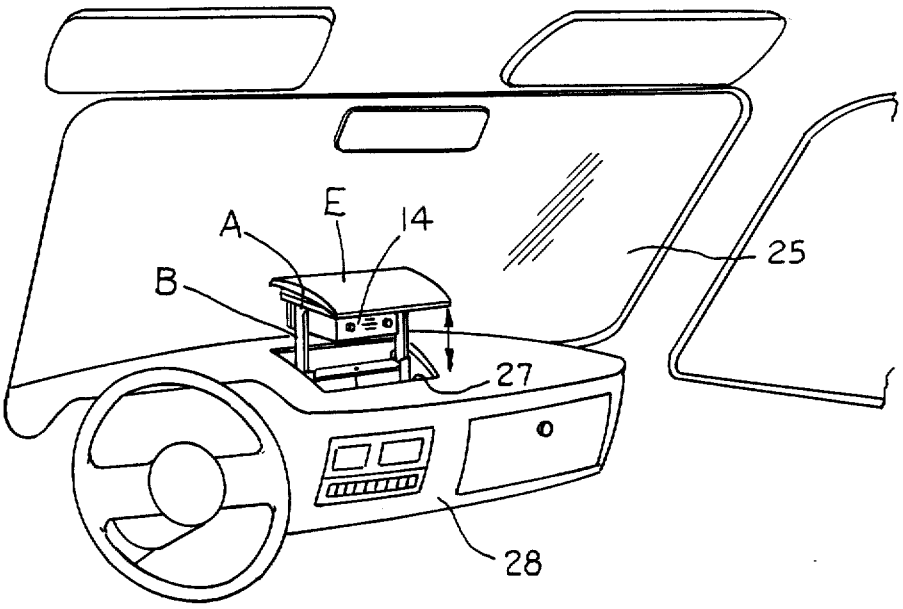
FIG. 4 is a perspective view illustrating an alternate form of the invention wherein the apparatus is mounted within the dash board of an automobile.
Figure 3:
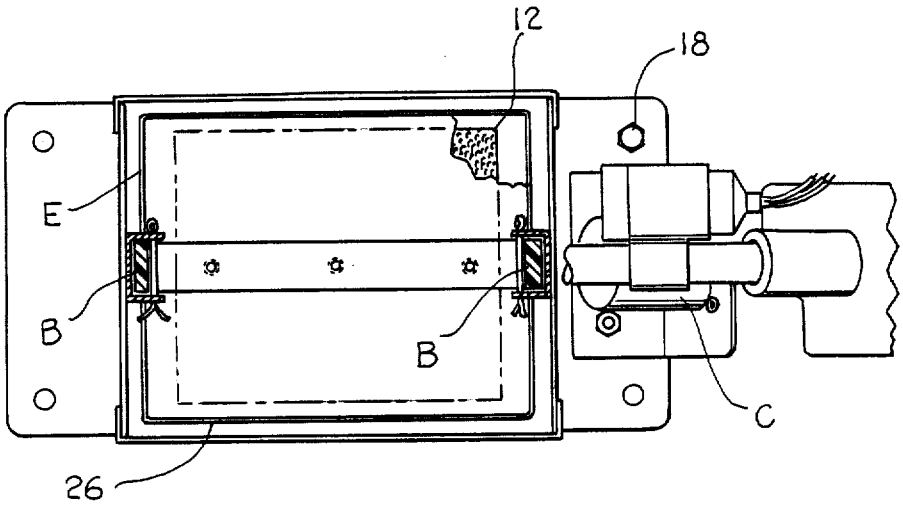
FIG. 3 is a plan view taken on the line 3—3 in FIG. 2.

A modified form of the invention is illustrated in FIG. 4 wherein a support member A is carried by linkage B for being stored in retracted position within a compartment having an opening 27 in the dash 28. A cover E is provided which is compatible with the upper substantially horizontal surface of the dash 28. If desired, the cover may be constructed so as to create a recess above the surface of the dash for receiving the radar detector and associated parts in retracted position in lieu of cutting the opening 27 in the upper surface of the dash.

When the ignition switch is turned on and the remote switch turned on, power is supplied to the radar detector and power operated means is actuated for lowering the support and the radar detector from the ceiling as in FIG. 1 or raised as in FIG. 4. The radar detector is returned to stored position in the ceiling by either opening of the remote switch or the ignition switch. Such deploying and retracting of the radar detector may be otherwise controlled as desired as by providing a switch actuated responsive to operating conditions of the vehicle such as the attainment of a predetermined speed or speeds or such may be simply manually operated.

Figure 5:
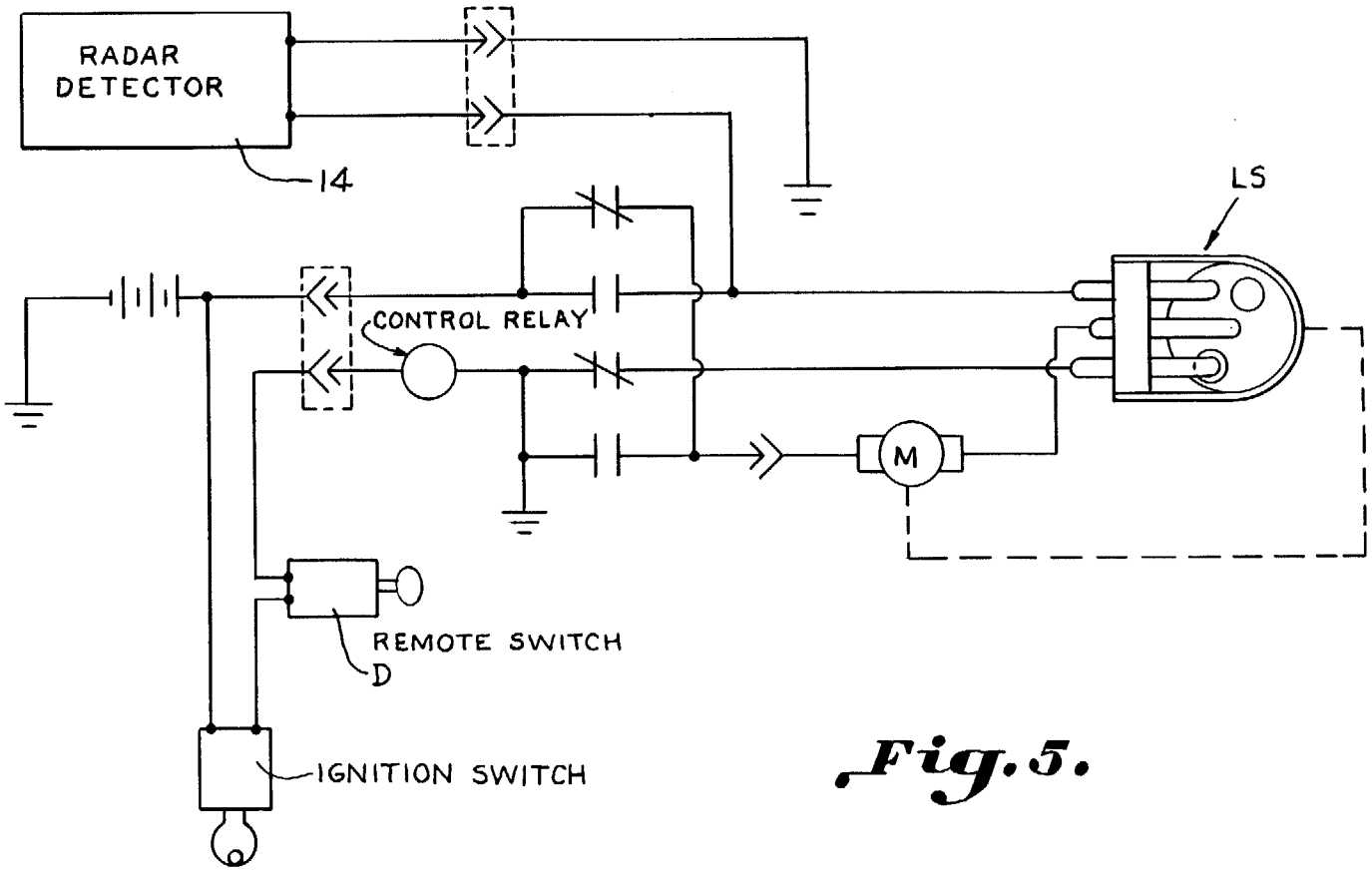
FIG. 5 is a block diagram illustrating the operation of various electrical components of the apparatus.

The block diagram of FIG. 5 illustrates the electrical components including the remote switch D, as well as an ignition switch. The circuit is energized to raise the radar detector by closing of one of the pairs of contacts of the control relay. When the control relay contacts return to the downwinding, the electric motor M for lowering the radar detector is energized. Limit switch LS contacts prevent excessive travel in either direction, and preferably both are adjustable. The components are illustrated with the assembly in raised position as in FIG. 1. The motor M operates the limit switch LS through a suitable worm and gear drive as schematically illustrated by the broken line in FIG. 5.

While a preferred embodiment of the invention has been described using specific terms, such description is for illustrative purposes only, and it is to be understood that changes and variations may be made without departing from the spirit or scope of the following claims.

That which is claimed is:

1. Apparatus for housing a radar detector between the roof and ceiling of an automotive vehicle and for deploying the radar detector in operable position comprising:

a support for said radar detector;

means carrying said support for movement from a retracted position between the roof and ceiling to a position below the ceiling wherein said radar detector is in operable position; electrically operated means moving said means carrying said support from said retracted position to said position below the ceiling and for returning said support to said retracted position; and switch means actuating said electrically operated means for moving the support from retracted position to said position;

whereby said radar detector may be readily moved and stored out of sight when the automobile vehicle is not in operation and returned to operable position.

2. The structure set forth in claim 1 wherein said switch means automatically actuates said electrically operated means responsive to a change in the operating condition of the vehicle.

3. The structure set forth in claim 2 wherein said electrically operated means is actuated responsive to opening of a ignition switch.

4. The structure set forth in claim 3 including a remote switch permitting actuation of said electrically operated means responsive to opening of the ignition switch moving said means carrying said support to said retracted position.

5. The structure set forth in claim 1 including Velcro means removably positioning said radar detector upon said support.

6. Apparatus for housing a radar detector in a retracted position within an automotive vehicle remote from a windshield and for deploying same in an operable position opposite the windshield comprising:

a movable support carrying said radar detector;

a compartment within said automotive vehicle remote from said windshield for receiving said support and radar detector in said retracted position;

a frame carried within said compartment,linkage means connected to said frame and to said movable support;

electrically operated means carried by said frame operating said linkage means for moving said support from retracted position within said compartment to operable position opposite the windshield and for returning said support from operable position to said retracted position; and switch means actuating said electrically operated means whereby said radar detector may be concealed within said compartment when said vehicle is not in operation and deployed in operable position during operation of the vehicle.

7. The structure set forth in claim 6 wherein said switch means is automatically actuated responsive to an operating condition of the vehicle, and means operable by the vehicle operator for overriding automatic operation of the switch means.

*8. Apparatus for housing an electronic device in a stored, concealed position behind an exposed inner surface of a vehicle and for deploying the electronic device in an operable position, comprising:*

*a support for the electronic device;*

*means for carrying the support for movement from the stored position to the operable position;*

*electrically operated means for moving said means carrying said support from the stored position to the operable position and for returning the support to the stored position; and*

*switch means for actuating the electrically operated means for moving the support from the stored position to the operable position and back again, the switch means automatically actuating said electrically operated means in response to a change in the operating condition of the vehicle;*

*whereby said electronic device may be readily moved and stored out of sight when the vehicle is not in operation and returned to operable position.*

*9. The structure set forth in claim 8 wherein said electrically operated means is actuated in response to opening of an ignition switch.*

*10. The structure set forth in claim 9 including a remote switch permitting actuation of the electrically operated means in response to opening of the ignition switch moving said means carrying said support to said stored position.*

* * * * *